United States Patent [19]

Rea

[11] 3,898,092

[45] Aug. 5, 1975

[54] METHOD FOR REDUCING ACID LEAD SOLUBILITY OF A LEAD-CONTAINING GLAZE OR FRIT

[76] Inventor: Robert F. Rea, 5400 Lanelake Rd., Bloomfield Hills, Mich.

[22] Filed: Oct. 29, 1971

[21] Appl. No.: 194,028

[52] U.S. Cl. .................. 106/49; 106/48; 65/31; 156/24
[51] Int. Cl.² .................. C03C 5/02; C03C 15/00
[58] Field of Search ....... 106/49, 48; 23/312; 65/31; 156/24

[56] References Cited
UNITED STATES PATENTS
2,634,195  4/1953  Pelz ...................................... 156/24

FOREIGN PATENTS OR APPLICATIONS
484,777  5/1938  United Kingdom

*Primary Examiner*—Patrick P. Garvin
*Assistant Examiner*—Mark Bell

[57] ABSTRACT

A method for reducing the acid lead solubility of a lead-containing glaze or frit. A lead-containing glass consisting essentially of not more than 70 percent by weight of lead oxide and at least 30 percent of silica is ground to the desired degree of fineness and leached in a dilute aqueous acid solution. A slip is formed by suspending the leached glass particles in a liquid, most commonly water. Further reduction in lead solubility may be accomplished by removal of glass particles finer than 5 microns, either before or after leaching of the glass particles.

6 Claims, No Drawings

METHOD FOR REDUCING ACID LEAD SOLUBILITY OF A LEAD-CONTAINING GLAZE OR FRIT

BACKGROUND OF THE INVENTION

This invention relates to a method for reducing the lead solubility of a lead-containing glaze or frit.

Lead is a valuable component in ceramic glazes. It is useful as a relatively low temperature flux, and adds brilliance to the glaze.

Like most heavy metals, lead and its compounds are poisonous. Although minute doses are apparently harmless, the danger from lead poisoning is amplified because the lead tends to accumulate in the body in the central nervous system, resulting in a sudden seizure. While compounds such as white lead, red lead, lead carbonate and litharge are all soluble in the gastric juices of the body, if the lead is present in a ratio corresponding to the molecular proportions of lead bisilicate, $PbO.2SiO_2$, the solubility is greatly reduced. Addition of small amounts of $Al_2O_3$ and $TiO_2$ may reduce the solubility of the lead bisilicate further. Because of the solubility of lead compounds in the gastric juices of the body, various countries have set limits on the lead solubility, for example in a 0.25 percent hydrochloric acid solution, of lead-containing, raw (unfired) glazes and frits. In England, lead-containing glazes or frits can be used only if the solubility of the unfired glaze or frit does not exceed 5 percent. The maximum solubility in Holland and Germany is 2.5 percent and 1 percent respectively. This approach to the problem of reducing the danger of lead poisoning in the manufacture and use of lead-containing glazes and frits has been quite successful in reducing cases of lead poisoning. However, because of increased concern and knowledge relating to environmental health and safety, it is desirable that the solubility of lead-containing glazes and frits be reduced even further than has been accomplished by the expedient of using lead bisilicate.

SUMMARY OF THE INVENTION

The instant invention is based upon the discovery of a method for reducing the lead solubility of lead-containing glazes or frits. A ground glass consisting of up to 70 percent of lead oxide and at least 30 percent of silica is treated with dilute aqueous acid. The dilute aqueous acid reduces the lead content at the surface of the glass particles. The leached glass particles are then suspended in a liquid such as water to form a slip. Removal of glass particles finer than 5 microns, prior to or after leaching the glass particles further reduces the lead solubility.

Accordingly, it is an object of this invention to provide a method for substantially reducing the solubility of lead-containing glazes and frits.

It is a further object of this invention to provide a method for reducing the solubility of lead bisilicate glazes and frits.

DESCRIPTION OF THE PREFERRED EMBODIMENTS

Lead solubility of the lead-containing glazes, as reported herein, was determined by exposing a 0.5 gram sample of the frit to 500 ml. 0.25 percent (0.0685 N) hydrochloric acid at 20°C. for 2 hours, and determining the percentage of lead, calculated as lead oxide, leached therefrom.

EXAMPLE I

A commercially available lead bisilicate frit having the following reported composition* was treated as indicated below, and tested for lead solubility:

|  | Percent by Weight |
|---|---|
| $SiO_2$ | 34 |
| $PbO$ | 65 |
| $Al_2O_3$ | 1 |

Sample A was tested for lead solubility as described above. Sample B was tested for lead solubility after acid treatment which consisted of exposing a 165 gram portion of the frit to 1000 ml. of 0.1N nitric acid at 20°C. for 1 hour. Sample C was first elutriated to remove essentially all particles less than 5 microns in size, and the remaining glass particles larger than 5 microns were subjected to an acid treatment with 0.1N acetic acid at 20°C. for 1 hour. Acid treatment of Sample B and C produced a soluble lead salt. The lead salt was removed by thoroughly washing the treated frit. The treated frit was then tested for lead solubility as indicated. Sample D was first elutriated to remove essentially all particles less than 5 microns in size, and the remaining coarser particles were tested for lead solubility. Table I lists the soluble lead found for each sample; percent PbO is based on the total weight of the dry frit or glaze sample.

*Sold under the trade designation Ceraflux, by Hammond Lead Products, Inc.; the composition is that reported by the manufacturer.

TABLE I

| Sample | Treatment | Soluble Lead as Percent PbO |
|---|---|---|
| A | Untreated | 2.8 |
| B | 20° Acid pretreatment, 0.1N nitric | 0.4 |
| C | 20° Acid pretreatment and elutriation, 0.1N acetic | 0.3 |
| D | Elutriation | 1.1 |

In using the method of the invention, the glass is first ground to substantially the degree of fineness desired in the slip before leaching the glass in dilute acid. Since further grinding would expose new surface areas on the glass, it is preferable that grinding after acid treatment be avoided, or kept to a minimum.

EXAMPLE II

A second lead bisilicate having the composition* described in Example I but a substantially higher untreated solubility was treated as described in Example I, except that 0.05N nitric acid was used for the acid treatment:

TABLE II

| Sample | Treatment | Soluble Lead as Percent PbO |
|---|---|---|
| A | Untreated | 6.0 |
| B | 20° Acid pretreatment, 0.1N nitric | 0.8 |
| C | 20° Acid pretreatment and elutriation, 0.05N nitric | 0.4 |
| D | Elutriation | 3.5 |

EXAMPLE III

*Sold under the trade designation Evans No. 300 by Evans Division, N

L Industries; the composition is that reported by the manufacturer.

Another commercial lead bisilicate frit having the following composition* was subjected to the same acid treatment as described in Example I, except that 0.1N nitric acid at 24°C. for 1 hour was used. Solubility decrease is shown in Table III:

|  | Percent by Weight |
|---|---|
| SiO$_2$ | 36 |
| PbO | 61 |
| Al$_2$O$_3$ | 3 |

TABLE III

| Sample | Treatment | Soluble Lead as Percent PbO |
|---|---|---|
| A | Untreated | 1.9 |
| B | 24° Acid pretreatment, 0.1N nitric | 0.4 |

Borax is commonly used in ceramic glazes as a fluxing agent. In the presence of lead, borax forms lead borosilicate, which is highly soluble in the presence of water or dilute acid. The action of alkalies in decreasing the acid resistance is also pronounced, although apparently not as great as that of boric oxide. Because of this undesirable solubility, it is common to use a double frit. The lead frit, normally a lead bisilicate as described above, has the maximum acid resistance attainable from the glaze constituents. The boric oxide and alkalies are then introduced in a second (lead-free) frit. In practice, the lead and silica are mixed togehter, often with minor additions as noted, and

*Sold under the trade designation Pb-545, by PEMCO Division, Glidden Co.; the composition is that reported by the manufacturer. melted to form lead bisilicate frit. A more soluble frit is formed from boron and sodium, other alkali metal oxides, alkaline earth oxides, and silica. The relatively soluble frit can then be mixed with the relatively insoluble lead bisilicate frit to produce a glaze having low lead solubility, since the soluble oxides of the first frit do not effect the lead solubility of the lead bisilicate. However because lead bisilicate, even when mixed with Al$_2$O$_3$, is partially soluble, it is desirable to further reduce the lead solubility of this frit by means of the method described in this invention.

EXAMPLE IV

The double frit approach to reducing the lead solubility of a lead-containing frit was used to determine the efficacy of using the method of the invention to reduce the lead solubility of the mixed frit.

A relatively insoluble lead bisilicate frit, having the composition described in Example III, was mixed with a relatively soluble but lead-free borosilicate frit. A second double frit was prepared, except that the lead bisilicate frit was first treated with 0.1N nitric acid for one hour at 24°C. before being mixed with the borosilicate frit. Each double frit was then tested for lead solubility as described heretofore:

TABLE IV

| Sample | Treatment | Soluble Lead as Percent PbO |
|---|---|---|
| Double frit | Untreated | 1.0 |
| Double frit | Acid pretreatment | 0.3 |

The experimental results shown in Table IV above demonstrate that by using the method of the invention with the double frit approach, a further reduction in lead solubility of over 50 percent can be achieved.

From the experimental results shown in Example II, it will be seen that a further reduction in lead solubility can be achieved if the lead bisilicate is also elutriated to remove minus 5 micron glass particles.

Depending on the final frit composition desired, constituents other than lead oxide, silica and boric oxide may be present in the double frit. More highly insoluble lead frits can be prepared when the constituents which tend to increase the lead solubility are introduced into the separate, lead-free frit. For example, such constituents as MgO, CaO, Na$_2$O, K$_2$O and ZnO are preferably added to the lead-free frit. Constituents which do not increase the lead solubility, such as Al$_2$O$_3$ and TiO$_2$ can be added to the lead silicate frit. In some cases it is possible for the lead silicate frit to have the composition desired in the final glaze, but where a significant amounts of lead solubilizers are desired, the two frit technique is preferred.

What I claim is:

1. A method for reducing the acid lead solubility of a lead-containing glaze, enamel or the like slip which method comprises leaching in a dilute aqueous acid finely divided particles of a glass consisting essentially of not more than 70 percent of lead oxide calculated as PbO and at least 30 percent of silica which glass has previously been ground to substantially the degree of fineness desired in the slip, controlling the temperature and the duration of the leaching steps to reduce the soluble lead content at the surfaces of the glass particles to not more than about 0.8 percent, based on the weight of lead, calculated as PbO, removed from a 0.5 gram sample of the finely divided particles upon exposure to 500 ml. 0.25 percent hydrochloric acid at 20°C for two hours, washing the leached glass particles, and forming a slip by suspending the leached glass particles in water.

2. A method as claimed in claim 1 wherein the lead silicate contains from ½ to 5 percent of alumina in addition to lead and silica.

3. A method as claimed in claim 2 wherein the glass contains about 65 percent of lead oxide and about 35 percent of silica.

4. A method as claimed in claim 1 wherein a substantially lead-free frit that has previously been ground to the degree of fineness desired in the slip is mixed with the leached glass particles, and the slip is formed by suspending the resulting mixture.

5. A method as claimed in claim 1 wherein glass particles finer than about 5 microns are separated from the ground glass prior to the formation of the slip, and the slip is formed from the remaining coarser particles.

6. In a method for reducing the acid lead solubility of a lead-containing glaze, enamel or the like slip, which method comprises grinding a glass consisting essentially of not more than 70 percent of lead oxide calculated as PbO and at least 30 percent of silica to substantially the degree of fineness desired in the slip, and forming a slip by suspending the glass particles in water, the improvement of leaching the ground glass in a dilute aqueous acid, controlling the temperature and the duration of the leaching step to reduce the soluble lead content at the surfaces of the glass particles to not more than about 0.8 percent, based on the weight of lead, calculated as PbO, removed from a 0.5 gram sample of the finely divided particles upon exposure to 500 ml. 0.25 percent hydrochloric acid at 20°C for two hours, and washing the leached glass particles before the slip is formed.

* * * * *

UNITED STATES PATENT OFFICE
CERTIFICATE OF CORRECTION

Patent No. 3,898,092　　　　　　　Dated August 5, 1975

Inventor(s) Robert F. Rea

It is certified that error appears in the above-identified patent and that said Letters Patent are hereby corrected as shown below:

In the heading of the patent the assignee is:
Champion Spark Plug Company
Toledo, Ohio Signed and Sealed this twenty-eight Day of October 1975

[SEAL]

Attest:

RUTH C. MASON
*Attesting Officer*

C. MARSHALL DANN
*Commissioner of Patents and Trademarks*